(12) United States Patent
Sheneman

(10) Patent No.: US 11,952,961 B2
(45) Date of Patent: Apr. 9, 2024

(54) ENERGY PUMP

(71) Applicant: L. Doug Sheneman, Drape, UT (US)

(72) Inventor: L. Doug Sheneman, Drape, UT (US)

( * ) Notice: Subject to any disclaimer, the term of this patent is extended or adjusted under 35 U.S.C. 154(b) by 0 days.

(21) Appl. No.: 17/525,896

(22) Filed: Nov. 13, 2021

(65) Prior Publication Data

US 2022/0154669 A1    May 19, 2022

Related U.S. Application Data

(60) Provisional application No. 63/114,509, filed on Nov. 16, 2020.

(51) Int. Cl.
| | | |
|---|---|---|
| *F02G 5/00* | (2006.01) |
| *F02C 6/18* | (2006.01) |
| *F25B 1/00* | (2006.01) |
| *F25B 41/30* | (2021.01) |

(52) U.S. Cl.
CPC .............. *F02G 5/00* (2013.01); *F02C 6/18* (2013.01); *F25B 1/00* (2013.01); *F25B 41/30* (2021.01); *F02G 2243/00* (2013.01); *F02G 2256/00* (2013.01); *F05D 2220/60* (2013.01); *F25B 2400/141* (2013.01)

(58) Field of Classification Search
CPC ...... F25B 1/00; F25B 41/30; F25B 2400/141; F25B 25/005; F25B 6/04; F02C 6/18; F02G 2243/00; F02G 2256/00; F05D 2220/60
See application file for complete search history.

(56) References Cited

U.S. PATENT DOCUMENTS

| | | |
|---|---|---|
| 5,617,738 A | 4/1997 | Ikegami et al. |
| 7,363,766 B2 | 4/2008 | Eisenhour |
| 2005/0220646 A1* | 10/2005 | Ogawa ..................... F25B 1/04 418/55.1 |

FOREIGN PATENT DOCUMENTS

| | | |
|---|---|---|
| CN | 101799194 B | 6/2012 |
| DE | 102014002596 A1 | 8/2015 |
| KR | 100768334 B1 * | 10/2007 |
| KR | 1020120126988 A | 11/2012 |
| KR | 1020160149083 A | 12/2016 |

* cited by examiner

*Primary Examiner* — Kun Kai Ma
(74) *Attorney, Agent, or Firm* — Bateman IP; Randall B. Bateman

(57) ABSTRACT

An air conditioning system includes a compressor and a refrigerant line. A power generating unit may be disposed along the refrigerant line to generate power from the heat in the refrigerant line while helping to convert hot compressed refrigerant gas into a hot high-pressure refrigerant liquid. An air conditioning system may also involve using a cooling chamber to use refrigerant to cool a heat exchange medium which is then used in a cooling coil to condition air.

24 Claims, 7 Drawing Sheets

ENERGY PUMP

BACKGROUND

State of the Art

The present invention relates to an energy pump and/or air conditioning system which may be used to generate energy.

Field of Art

In a common air conditioning system, a warm, low pressure gas refrigerant is sucked/pumped/pushed into the suction or low-pressure side of a compressor. The compressor compresses the gas refrigerant to create a high-pressure hot gas. The high-pressure hot gas refrigerant is then passed by hot side tubing to a condenser coil. As the high-pressure hot gas refrigerant passes through the condenser coil, some of the heat is removed from the refrigerant so that the refrigerant is converted into a high-pressure hot liquid. In many home and commercial air conditioning systems, the condenser coil has one or more fans which promotes airflow across the coil to help draw heat out of the refrigerant.

The high-pressure hot liquid refrigerant is then pumped/pushed by the compressor to be passed to an expansion valve or orifice where the refrigerant is released into a low-pressure environment. The low pressure allows the refrigerant liquid to expand, causing the refrigerant to turn into a low temperature (gas) liquid which is very cold. The cold refrigerant is then passed through an evaporator coil wherein warm air passing through the coil is cooled, and the refrigerant in the evaporator is heated (absorbing the air temperature)—causing the refrigerant to boil and become a low-pressure gas. The warm low-pressure gas is then returned to the compressor, where the refrigerant starts the cycle again.

Air conditioning systems typically require a substantial amount of power to run the compressor and to drive the fans which help to move air through the respective coils. It would be advantageous to have an air conditioning system which utilized the process to generate energy.

SUMMARY OF THE INVENTION

The following summary of the present invention is not intended to describe each illustrated embodiment or every possible implementation of the invention, but rather to give illustrative examples of application of principles of the invention.

In some configurations, the compressor is disposed in communication along the hot side tubing with one or more power generating units.

In some embodiments, the power generating units are configured to convert heat in the hot refrigerant into electrical energy.

In some embodiments, the power generating units are configured to convert the heat in the hot refrigerant into mechanical energy.

In some embodiments, the refrigerant line is passed through a coolant exchanger so that the refrigerant line cools the cooling medium disposed in the coolant exchanger. The cooling medium may then be pumped to a cooling coil or the like inside the home or other area to be cooled, thereby allowing the cooling of warm air.

The warmed cooling medium may then be returned to the coolant exchanger to be recooled by the cool refrigerant.

DESCRIPTION OF THE DRAWINGS

Various embodiments of the present disclosure are shown and described in reference to the numbered drawings wherein.

Figure 1:
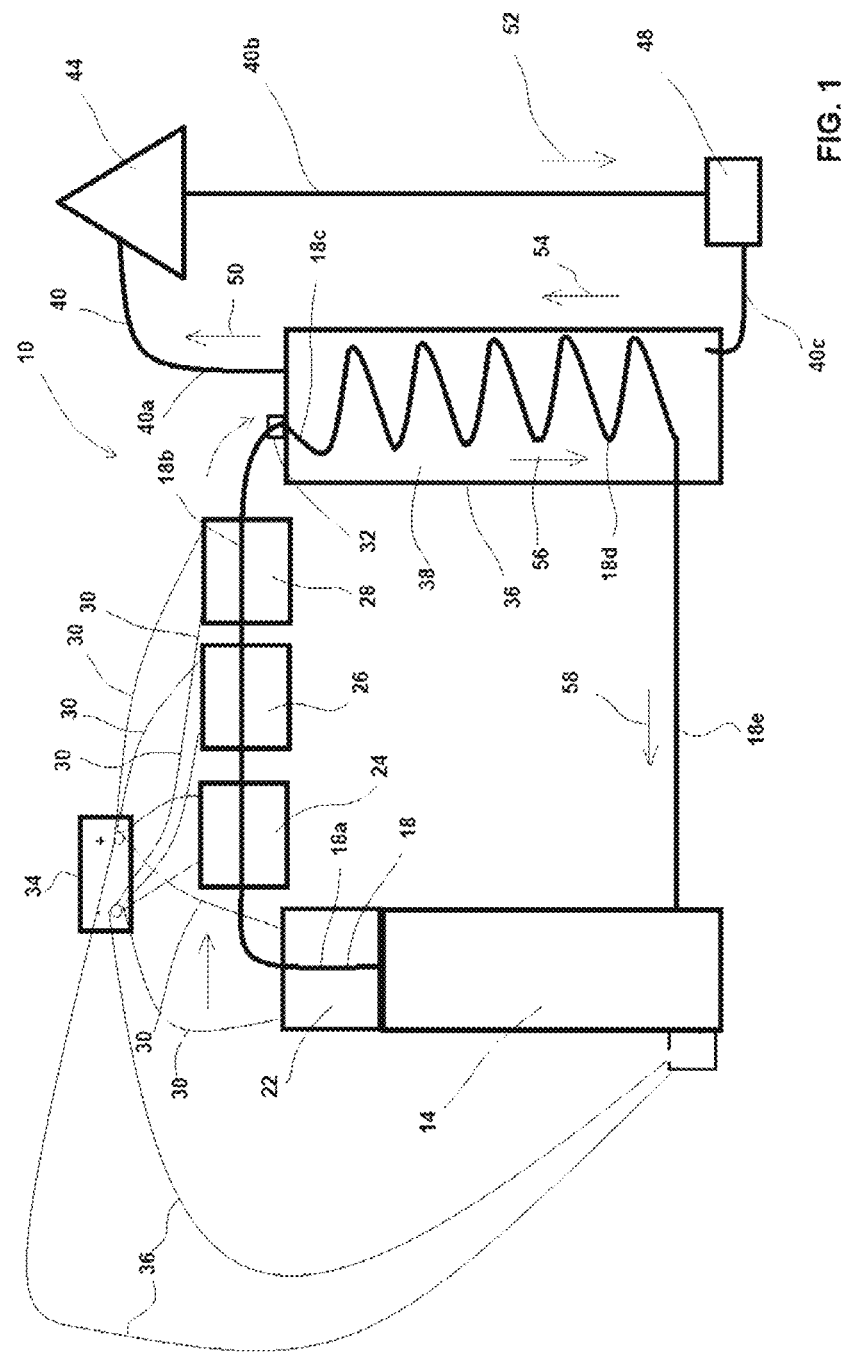
FIG. 1 illustrates an air conditioning system formed in accordance with one aspect of the present disclosure.

It will be appreciated that the drawings are illustrative and not limiting of the scope of the invention which is defined by the appended claims. The embodiments shown accomplish various aspects and objects of the invention. It will be appreciated that it is not possible to clearly show each element and aspect of the present disclosure in a single figure, and as such, multiple figures are presented to separately illustrate the various details of different aspects of the invention in greater clarity. Similarly, not all configurations or embodiments described herein or covered by the appended claims will include all of the aspects of the present disclosure as discussed above.

DETAILED DESCRIPTION

Various aspects of the invention and accompanying drawings will now be discussed in reference to the numerals provided therein so as to enable one skilled in the art to practice the present invention. The skilled artisan will understand, however, that the methods described below can be practiced without employing these specific details, or that they can be used for purposes other than those described herein. Indeed, they can be modified and can be used in conjunction with products and techniques known to those of skill in the art in light of the present disclosure. It will be appreciated that the drawings may show aspects of the invention in isolation, and the elements in one figure may be used in conjunction with elements shown in other figures.

Reference in the specification to "embodiment," "configuration," or plural versions thereof means that a particular feature, structure, or characteristic described in connection with the embodiment may be included in at least one embodiment, etc., but does not require said feature, structure or characteristic to be present unless identified in the claims.

Before the present invention is disclosed and described in detail, it should be understood that terminology contained herein is used for the purpose of describing particular aspects of the invention only and is not intended to limit the invention to the aspects or embodiments shown unless expressly indicated as such. The invention is not limited to any particular embodiments, configurations, structures, process steps, or materials discussed or disclosed herein, except as set forth in the appended claims. Moreover, the claims are intended to include equivalents thereof as would be recognized by those of ordinarily skill in the relevant art. Likewise, the discussion of any particular aspect of the invention is not to be understood as a requirement that such aspect is required to be present apart from an express inclusion of that aspect in the claims.

It should also be noted that, as used in this specification and the appended claims, singular forms such as "a," "an," and "the" may include the plural unless the context clearly dictates otherwise.

As used herein, the term "substantially" refers to the complete or nearly complete extent or degree of an action, characteristic, property, state, structure, item, or result to function as indicated. For example, an object that is "substantially" enclosed would mean that the object is either completely enclosed or nearly completely enclosed. The exact allowable degree of deviation from absolute completeness may in some cases depend on the specific context, such that enclosing nearly all of the length of a lumen would be substantially enclosed, even if the distal end of the structure enclosing the lumen had a slit or channel formed along a portion thereof. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

As used herein, the term "generally" refers to something that has characteristics of a quality without being exactly that quality. For example, a structure said to be generally vertical would be more vertical than horizontal, i.e., would extend more than 45 degrees from horizontal. Likewise, something said to be generally circular may be rounded but need not have a consistent diameter in every direction.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Turning now to FIG. 1, there is shown an air conditioning system, generally indicated at 10. The air conditioning system 10 may include a compressor 14 which may be connected to a refrigerant line 18. As the refrigerant line 18 leaves the compressor 14, the contents of the refrigerant line would typically be high pressure hot refrigerant gas. In a conventional cooling system, the refrigerant line 18 would be connected to a condenser, wherein air is passed through a condenser coil to cool the refrigerant so that it becomes a high-pressure hot liquid.

As shown in FIG. 1, disposed adjacent to the compressor 14 is a first power generating unit 22. Instead of requiring additional energy input to cool the high-pressure hot gas, the first power generating unit utilizes heat from the refrigerant line 18 along a first portion 18a to drive energy generation. As will be explained in additional detail below, the first power generating unit 22 may include a turbine engine wherein the heat from the refrigerant line 18 is used to rotate the turbine and thereby create electricity. Likewise, the power generating unit may be a piston engine wherein heat from the refrigerant line 18 is used to drive the piston to thereby create energy. The power generating unit 22 may also be a Stirling engine which uses heat differentials to create mechanical energy. The mechanical energy may be used directly, or may be converted into electrical energy by an alternator, etc.

The power generating unit 22 may also be a steam engine wherein the fluid used in the steam engine has a sufficiently low boiling point that it can be turned into a gas by the heat from the refrigerant line 18. The steam engine may then be used to generate additional power driven by the gas.

Use of heat from the refrigerant line 18 passing through the first power generating unit 22 helps to cool the high pressure, hot gas in the refrigerant line. The refrigerant line 18 may have a portion 18b which is directed through additional power generating units, such as second power generating unit 24, third power generating unit 26, and fourth power generating unit 28. At each stage heat from the refrigerant line 18 may be used to generate power while simultaneously reducing the temperature of the refrigerant in the refrigerant line 18. As shown in FIG. 1, the power generating units 22, 24, 26, and 28 have electrical lines 30 which connect to a battery 34 to receive and store electricity generated by the power generating units 22, 24, 26, and 28. In some embodiments, the battery 34 may be connected to a converter in communication with the compressor 14 which is configured to run on a/c or d/c power. In some locations, it is not uncommon to have brownouts during the summer due to excessive load as consumers attempt to cool their homes. In such a situation, the battery 34 may provide sufficient power for the compressor to run for a period of time during a brownout or other power failure to thereby keep the house more comfortable. Alternatively, the battery 34 may be used to power other electrical components.

By the time the refrigerant line 18 passes out of the last power generating unit 28, the refrigerant has been converted from a hot gas into a hot liquid. The refrigerant then encounters an expansion valve 32 or orifice as the refrigerant line 18 enters into a cooling chamber 36, which may be filled with a heat transfer medium 38, such as glycol or other known liquids or gases. The expansion allows the refrigerant in the portion 18c of the refrigerant line 18 to get very cold, thereby cooling the heat transfer medium 38 in the cooling chamber.

The cooling chamber 36 may be connected to a heat transfer line 40, which is connected to a cooling coil 44 and a pump 48. Cold heat transfer medium may move through a first portion 40a of the heat transfer line 40 and to the cooling coil 44 as indicated by arrow 50. As the cold heat transfer medium passes through the cooling coil 44, a fan or the like may blow warm air across the cooling coil, thereby cooling the blown air and warming the heat transfer medium. A portion 40b of the heat transfer line 40 may convey the heat transfer medium to a pump 48, as indicated by arrow 52. The pump 48 which keeps the heat transfer medium flowing through the last portion 40c of the heat transfer line where the heat transfer medium may return the heat transfer medium to the cooling chamber 36, where it rises as indicated by arrow 54.

Thus, there may be a heat gradient in the cooling chamber 36, with the heat transfer medium being substantially warmer at one end than the other (in this case, the warm end being the lower end and the cold end being the top) with the refrigerant cooling the heat transfer medium and the heat transfer medium warming the refrigerant as they pass.

The heat transfer medium 38 entering the cooling chamber may be sufficiently warm to cause the refrigerant along the lower portion 18d of the refrigerant line 18 to boil off and become a low pressure gas once again as the refrigerant follows the direction of arrow 56. The lower pressure refrigerant then passes through the final portion 18e of the refrigerant line 18 as indicated by arrow 58 and returns to the compressor 14 to repeat the cycle.

Figure 2:
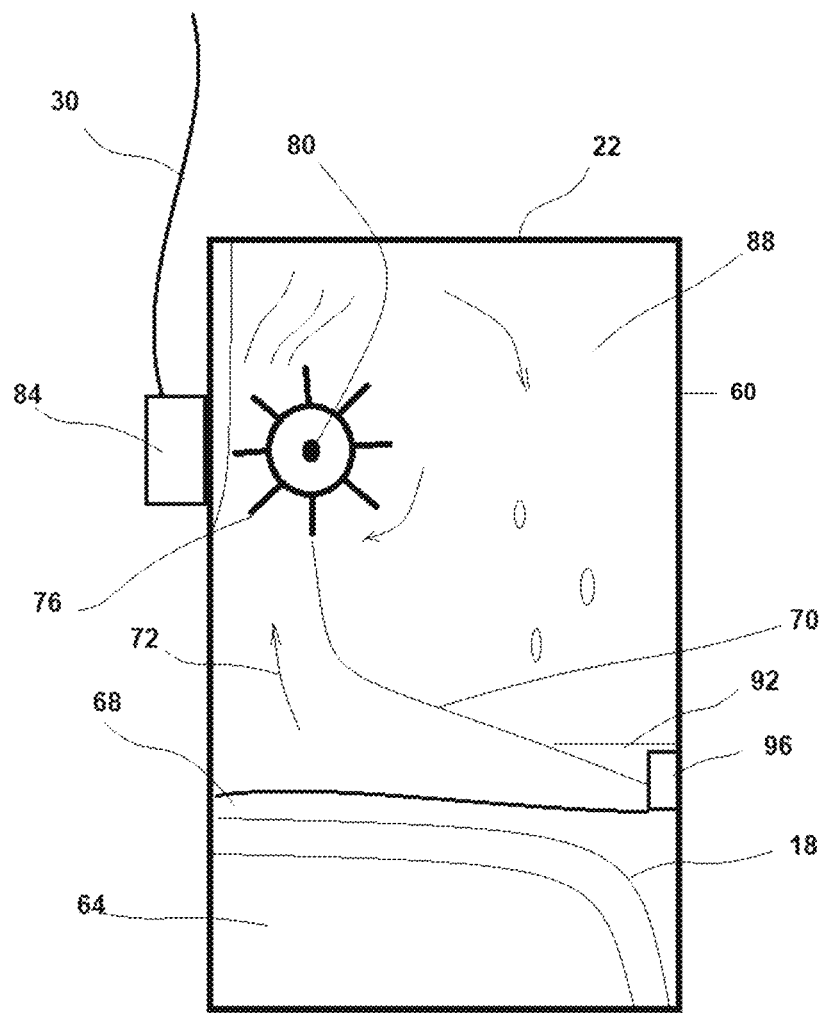
FIG. 2 illustrates a side view of one example of a power generator.

Turning now to FIG. 2, there is shown a power generating unit as may be used as described above. The power generating unit may include a vacuum chamber 60 which may include a reservoir 64 for holding a liquid 68. The liquid may be alcohol or some other liquid which has a boiling temperature below the temperature at which the pressurized hot liquid refrigerant is released from the compressor. It will be appreciated that doing so in a vacuum may lower the temperature at which the liquid will boil. The refrigerant line 18 may pass adjacent to or through the reservoir 64 so that the heat from the refrigerant line boils some of the liquid in the reservoir.

The gas created by boiling the liquid travels upward and may be directed by a wall 70 in the direction indicated by arrow 72 so that the upwardly moving gas rotates a turbine 76. The turbine 76 may be mounted on a drive shaft 80 which may extend through the wall of the vacuum chamber 60 with a seal, etc., to provide mechanical power or drive a generator 84 to create electrical energy. Alternatively, magnets may be used to drive a generator disposed outside of the chamber.

As gas passes the turbine 76, the gas passes into an expansion chamber 88 wherein it is able to cool and condense back into a liquid 92. The liquid may then pass through a one-way valve 96 and return to the reservoir 64 where it will repeat the cycle.

Figure 3:
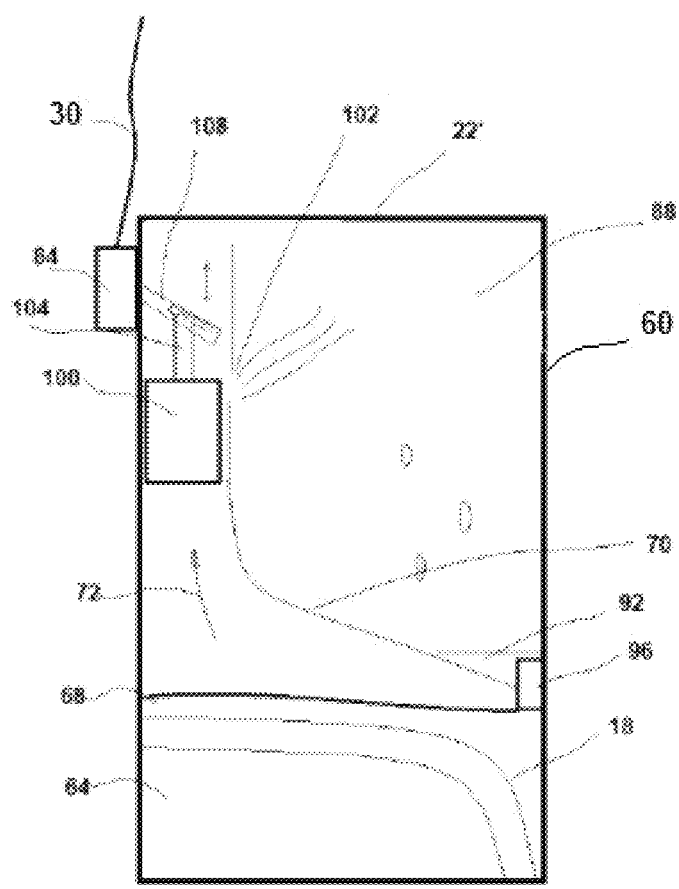
FIG. 3 illustrates a side view of another example of a power generator.

Turning now to FIG. 3, there is shown an alternate configuration of a power generating unit 22'. The power generating unit 22' may include a vacuum chamber 60 which is similar to that discussed with regard to FIG. 2. The vacuum chamber may include a reservoir 64 for holding a liquid 68 which can be boiled by the heat given off by the refrigerant line 18 which may pass adjacent to or through the reservoir 64. As the heated gas created by boiling the liquid rises, it may be directed by a wall 70 in the direction indicated by arrow 72. Instead of turning a turbine, however, the hot gas may lift a piston 100 until the piston passes an opening 102 which allows the hot gas to escape. The escaping of some of the gas allows the piston to fall back to its original position and the hot gas passing through the opening 102 moves into an expansion chamber 88, thereby allowing the gas to cool and return to a liquid state as shown at 92. The liquid may then pass through a one-way valve 96 to return to the reservoir 64.

The piston 100 may be connected to a pair of arms 104, 108 which are connected to a generator 84 to create power. Alternatively, the piston 100 may incorporate or be attached to one or more magnets which interact with the generator 84 so as to facilitate keeping a vacuum inside the chamber 60 which produces energy with the up and down movement of the piston 100 so that the upwardly moving gas rotates a turbine 76. The turbine 76 may be mounted on a drive shaft 80 which may extend through the wall of the vacuum chamber 60 with a seal, etc., to provide mechanical power or drive a generator 84 to create electrical energy. Alternatively, magnets may be used to drive a generator disposed outside of the chamber.

While FIGS. 2 and 3 show the turbine 76 and the piston 100 being disposed at the side of the chamber 60, it will be appreciated that either could be disposed in the middle or some other orientation. Likewise, the generator could be disposed in numerous different orientations to take advantage of the movement of the turbine, piston, etc.

Figure 4:
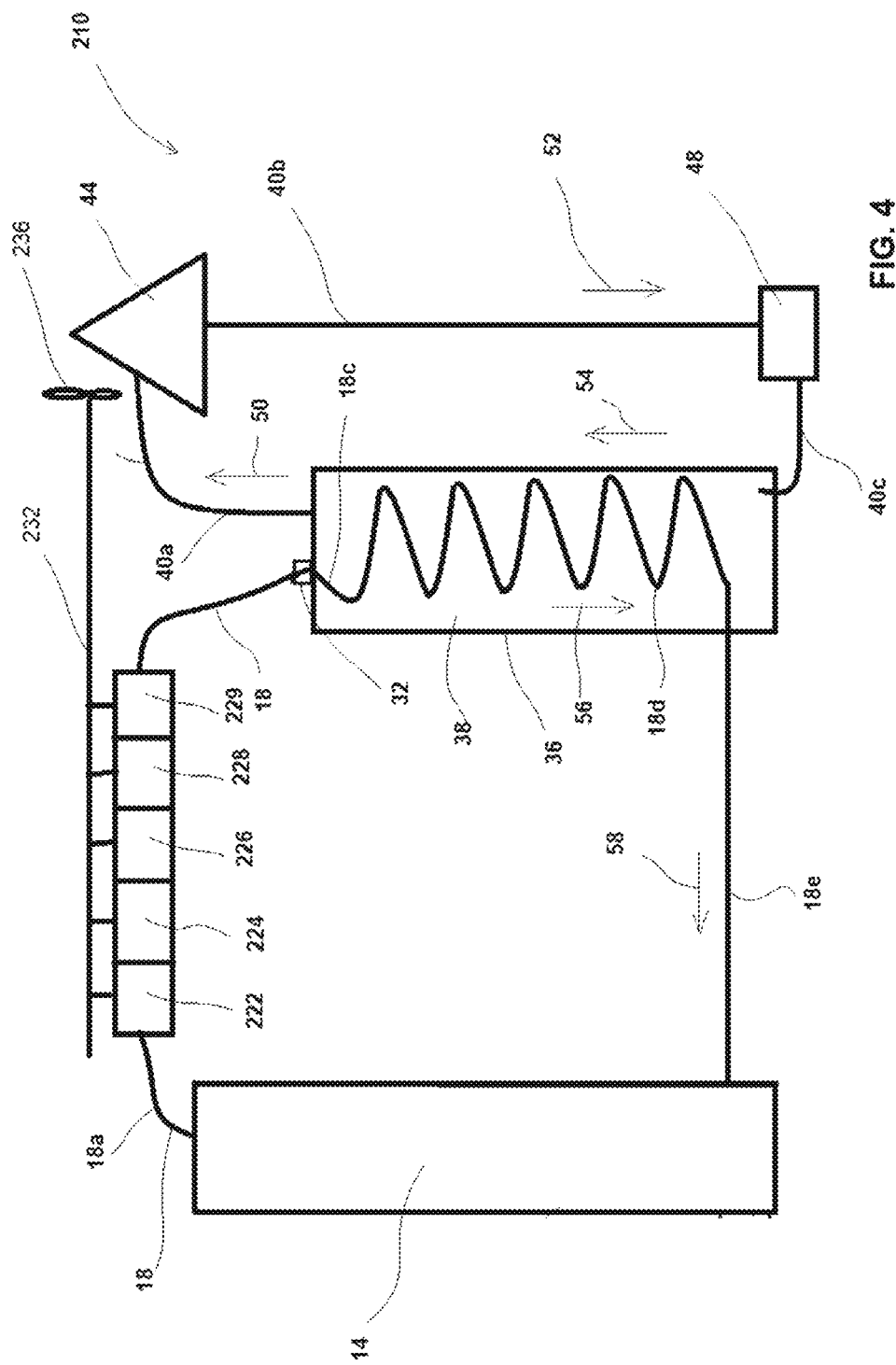
FIG. 4 illustrates another air conditioning system formed in accordance with one aspect of the present disclosure.

FIG. 4 shows an alternate configuration of an air conditioning system. The system generally indicated at 210. The system includes a compressor 14 and a refrigerant line 18 which functions substantially in the same way as described with respect to FIG. 1. Those portions of FIG. 4 which duplicate FIG. 1 are numbered accordingly and the discussion of those components is hereby incorporated by reference.

Instead of having power generating units which create electricity, the power generating units 222, 224, 226, 228 and 229 are configured to use mechanical energy to drive a drive shaft 232 which does work. As show in FIG. 4, the drive shaft 232 is attached to an impeller 236 which can be used to blow air across the cooling coil 44 through which the heat transfer fluid 38 passes. Thus, rather than wasting the heat in the refrigerant line 18 by venting it from a condenser, the heat 18 is used to drive the power generating units 222, 224, 226, 228 and 229. The power generating units 222, 224, 226, 228 and 229 may be piston or turbine driven units as discussed with respect to FIGS. 2 and 3. Alternatively, the power generating units 222, 224, 226, 228 and 229 may be Stirling engines. A Stirling engine is a heat engine which uses cyclic compression and expansion of a working fluid at different temperatures to convert heat energy to mechanical energy. The engine is close-cycle such that the working fluid is permanently contained within the system and moves between hot and cold sides to create mechanical work.

Figure 5:
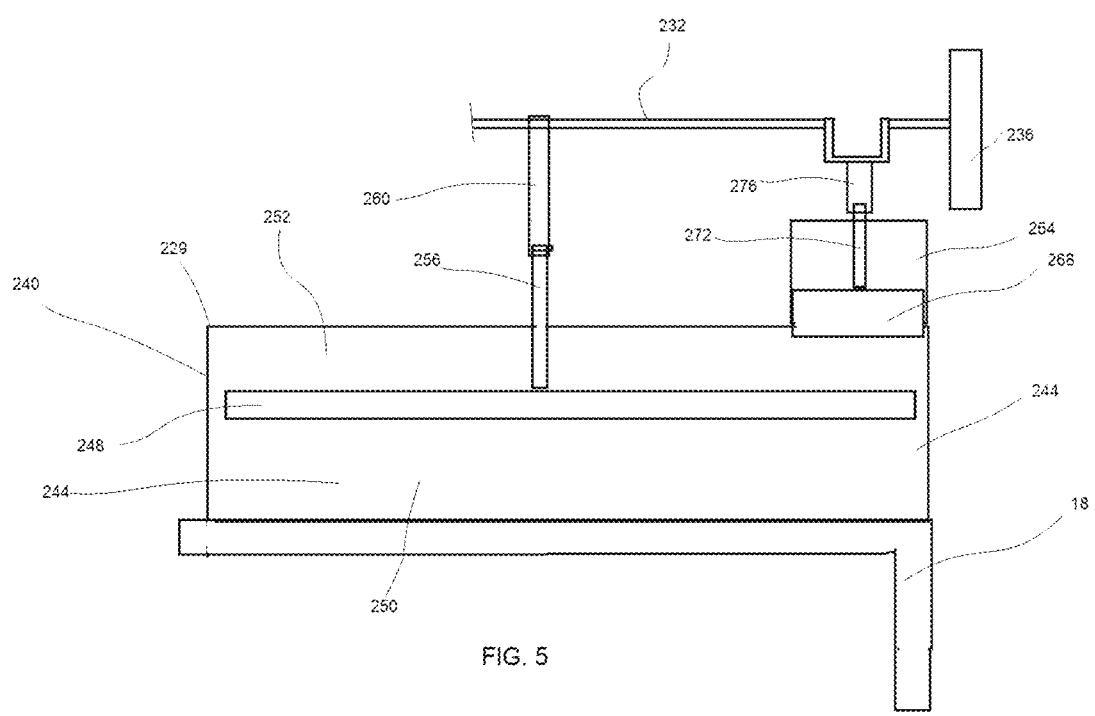
FIG. 5 shows one example of a power generator.

Turning to FIG. 5, wherein is shown a gamma Stirling engine 240. The Stirling engine includes a chamber 244 with a displacer 248 disposed therein. The displacer 248 divides the chamber 244 into a hot side 250 and a cold side 252. The displacer 248 is connected to a displacer rod 256, which is pivotably attached to a displacer connecting rod 260 which engages the drive shaft 232. The chamber 244 also includes a power piston cylinder 264 which receives a power piston 268 which is connected to a power piston rod 272 and a power piston connector rod 276 which engages the drive shaft 232. The power piston connector rod is disposed 90 degrees behind the displacer connecting rod 260.

Because the refrigerant line 18 is attached to the bottom of the chamber 244, the bottom of the chamber is hotter than the top, a temperature differential exists within the chamber. A Stirling engine can operate with a temperature differential as small as 2 degrees C., but the power derived is proportional to the temperature difference between the hot side and the cold side. Due to the substantial heat in the refrigerant line, a large heat differential can easily be accomplished. The displacer 248 is loose within the chamber 244 and air can flow around it. As heat is applied, the expansion of the air lifts the displacer 248. As the displacer 248 rises the expanding volume of hot gas, it eventually lifts the power piston 268 within the power piston cylinder 264. The hot air below the displacer 244 passes around the displacer to the cold side (i.e., above the displacer) as the displacer falls. The air on the cold side contracts in volume and creates a partial vacuum within the cylinder, pulling down the power piston 268.

When the power piston 268 is made to move by the changing pressure, the downward movement is conveyed via the power piston rod 272 and the power piston connecting rod to the drive shaft, forcing it to rotate. This forces the displacer rod 252 to move the displacer 248 upwardly, allowing air to flow into the hot side of the chamber where it is heated and drives the displacer upwardly, repeating the cycle.

The Stirling engine will run as long as a heat differential is being created between the two sides. Thus, as long as the compressor 14 is pumping out hot refrigerant, the Stirling engine will continue rotating the drive shaft 232. One difficultly with Stirling engines is that they often require an external force to overcome inertia and begin moving. One or more of the power generating units 222, 224, 226, 228 or 229 could be configured to provide the initial turning of the drive shaft 232 with the remaining power generating units acting as a Stirling engine.

Figure 6:
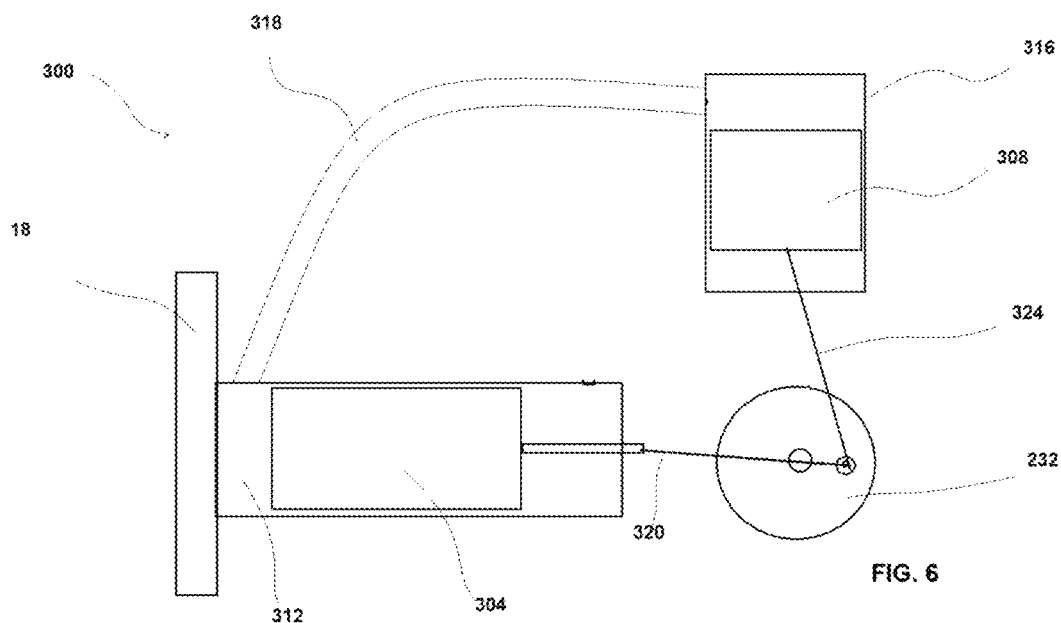
FIG. 6 shows another example of a power generator.

FIG. 6 shows an alpha Stirling engine 300. The Stirling engine 300 has two power pistons 304 and 308, which allows them to have a higher power to weight ratio than beta or gamma Stirling engines. Piston 304 is disposed in a cylinder 312 which is disposed in communication with the refrigerant line 18 and is thus the hot cylinder. The piston 308 is disposed in an unheated or cold cylinder 316. The two cylinders are disposed in communication with one another via an air conduit 318, which allows air to flow back and forth between the cylinders.

Each of the pistons may be is attached by a crank arm 320, 324 along a position on the crankshaft 232. The engine 300 essentially has four strokes, expansion, transfer, contraction, and transfer. In expansion, most of the air is in the hot cylinder 312. The gas heats and expands driving both pistons 304 and 308 toward the crankshaft 232. In the first transfer, the momentum of the flywheel drives the piston 304 away from the crankshaft, pushing most of the air into the cold cylinder 316. The air in the cold cylinder 316 contracts, effectively drawing both pistons 304 and 308 away from the crankshaft. The momentum of the flywheel carries the engine through the next 90 degrees, wherein the expansion stroke occurs again.

Other types of Stirling engines, such as a beta Stirling engine, may also be used.

Regardless of the type used, the heat drawn off of the refrigerant line 18 can be used to create power that can be used to run a blower or other device, thereby utilizing the heat to create energy rather than simply attempting to waste the heat in a condenser.

Figure 7:
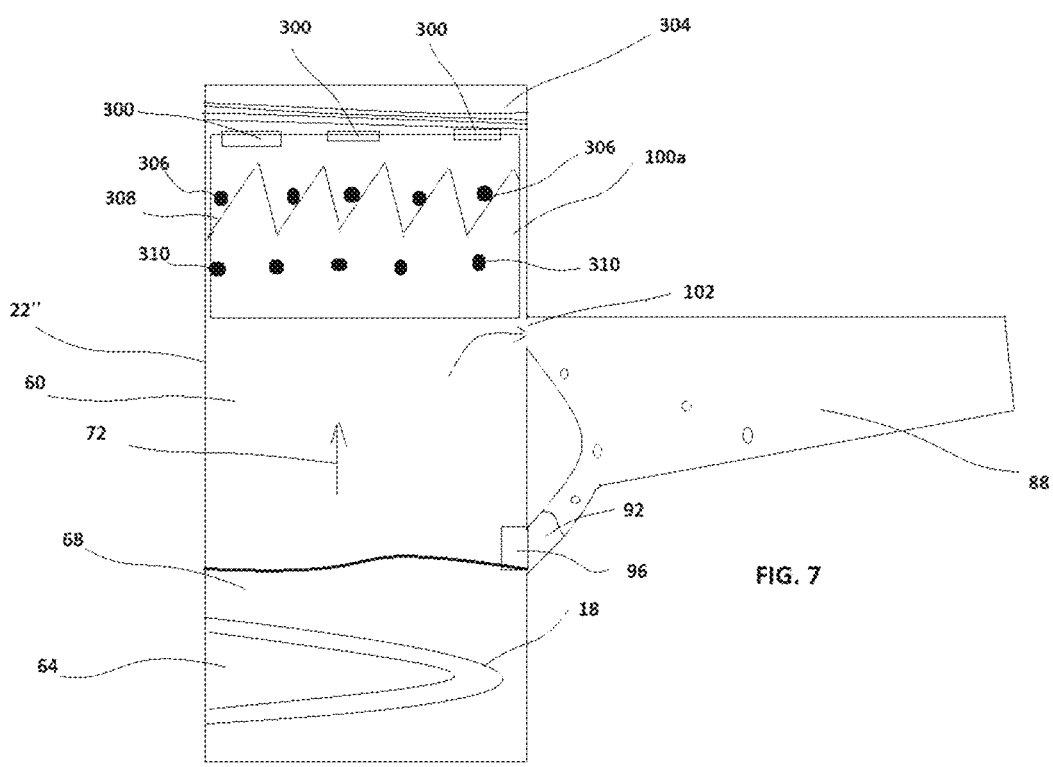
FIG. 7 show an alternate configuration of a power generator.

Turning now to FIG. 7, there is shown an alternate configuration of a power generating unit 22'. The power generating unit 22' may include a vacuum chamber 60 which is similar to that discussed with regard to FIGS. 2 and 3. The vacuum chamber 60 may include a reservoir 64 for holding a liquid 68 which can be boiled by the heat given off by the refrigerant line 18 which may pass adjacent to or through the reservoir 64. As the heated gas created by boiling the liquid rises in the direction indicated by arrow 72, the rising gas does "work." Instead of turning a turbine, however, the hot gas may lift a piston 100a until the piston passes an opening 102 which allows the hot gas to escape. The escaping of some of the gas allows the piston 102 to fall back to its original position and the hot gas passing through the opening 102 moves into an expansion chamber 88, thereby allowing the gas to cool and return to a liquid state as shown at 92. The liquid may then pass through a one-way valve 96 to return to the reservoir 64.

The piston 100a and the sidewall 302 may include a plurality of engagement members.

The engagement members may be in the form of nubs or projections 306 and one or more engagement wall 308. As the piston rises, the engagement wall 308 engages the nubs 306, thereby causing the piston 100a to rotate. Once the gas has escaped from the opening 102, the piston is able to move downwardly. As it does so a lower set of nubs of projections 310 engage the engagement wall 308 to continue the rotation of the piston 100a. The piston 100a may carry one or more magnets 300 and an induction coil 304 may be used to generate electricity as the piston rotates. It will be appreciated that various engagement members may be disposed on the piston and the housing to facilitate rotation of the piston as it moves upwardly and downwardly. Thus, the heat of the fluid can be converted to mechanical and then electrical energy.

It will be appreciated that there are multiple different engagement structures and patterns that can be used to encourage the piston 100a to rotate as the piston moves up and down responsive to the liquid 68 boiling. The pending claims are intended to cover such designs.

It will be appreciated that different combinations of power generating units may be used. For example, the power generating units 22, 22' 22" of FIG. 2, 3 or 7 could be used to take off a first load of heat from the fluid, and the Sterling engines shown in FIGS. 5 and 6 could be used once the fluid is less likely to boil the medium because they can operate on such a small differential in heat. In this way, the heat generated during the air conditioning process can be at least partially converted back into electricity, thereby reducing or eliminating the venting of waste heat through a cooling tower, etc.

Thus, there is disclosed an air conditioning system. It will be appreciated that numerous modifications may be made without departing from the scope and spirit of this disclosure. The appended claims are intended to cover such modifications and to cover equivalents of the structures described herein.

What is claimed is:

1. An air conditioning system comprising:
   a compressor,
   a refrigerant line disposed in communication with the compressor for carrying refrigerant; and
   at least one power generating unit disposed in communication with the refrigerant line for converting heat from the refrigerant line into usable energy by moving a mechanical structure,
   wherein the at least one power generating unit comprises a turbine and a vacuum chamber having a reservoir holding a fluid and wherein the refrigerant line is disposed in communication with the reservoir to boil a liquid contained therein, and wherein the vacuum chamber includes an expansion chamber disposed on a side of the turbine functionally opposite of the reservoir.

2. The air conditioning system of claim 1, further comprising a one-way valve disposed between the expansion chamber and reservoir.

3. The air conditioning system of claim 1, wherein the at least one power generating unit comprises a piston.

4. The air conditioning system of claim 3, wherein the vacuum chamber has a wall dividing the vacuum chamber into a reservoir portion and an expansion chamber and wherein the piston is moveable between a first position wherein the piston closes an opening between the reservoir portion and the expansion chamber and a second position wherein the piston allows the passage of fluid from the reservoir portion to the expansion chamber.

5. The air conditioning system of claim 1, wherein the mechanical structure includes one or more magnets.

6. The air conditioning system of claim 5, wherein the mechanical structure is disposed in communication with a generator for generating electricity when the mechanical structure is moved.

7. The air conditioning system of claim 1, wherein the air conditioning system comprises a cooling chamber filled with a heat transfer fluid and wherein the refrigerant line passes through the cooling chamber.

8. The air conditioning system of claim 1, further comprising a cooling chamber and a pump, and wherein the compressor and the refrigerant line are configured to pass refrigerant through the cooling chamber in a first direction and wherein the cooling chamber is disposed in communication with the pump configured to pump heat transfer medium through the cooling chamber in an opposite direction from the first direction.

9. The air conditioning system of claim 8, wherein the refrigerant is pumped in a first direction and wherein the heat transfer fluid in the cooling chamber is pumped in an opposing direction.

10. The air conditioning system of claim 1, wherein the at least one power generating unit comprises a power generating unit which is disposed in communication with a crankshaft.

11. The air conditioning unit of claim 10, wherein the crankshaft is attached to an impeller.

12. The air conditioning system of claim 1, wherein the at least one power generating unit comprises a power generating unit having a Sterling engine.

13. The air conditioning system of claim 12, wherein the Sterling engine is attached to a crankshaft.

14. The air conditioning system of claim 1, wherein the at least one power generating unit comprises a rotating piston.

15. An air conditioning system comprising:
a compressor;
a refrigerant line disposed in communication with the compressor;
at least one power generating unit disposed in communication with the refrigerant line for converting heat from the refrigerant line into usable energy by moving a mechanical structure,
the at least one power generating unit comprising a turbine and a vacuum chamber having a reservoir holding a fluid and wherein the refrigerant line is disposed in communication with the reservoir to boil a liquid contained therein, and wherein the vacuum chamber includes an expansion chamber disposed on a side of the turbine functionally opposite of the reservoir;
a cooling chamber, the refrigerant line passing through the cooling chamber;
a cooling coil;
a heat transfer line attached adjacent one end of the cooling chamber, passing through the cooling coil, and returning to the cooling chamber; and
a pump disposed along the heat transfer line.

16. The air conditioning system of claim 15, further comprising an expansion valve disposed along the refrigerant line in or adjacent the cooling chamber.

17. The air conditioning system of claim 15, wherein the cooling chamber is filled with a heat exchange medium and the refrigerant line is filled with refrigerant.

18. The air conditioning system of claim 17, wherein the compressor is configured to push refrigerant through the refrigerant line so that the refrigerant passes through the cooling chamber in a first direction and wherein the pump is configured to push heat exchange medium through the cooling chamber in a second direction generally opposite the first direction.

19. The air conditioning system of claim 15, wherein the power generating unit comprises a rotating piston.

20. The air conditioning system of claim 15, wherein at least one Stirling engine is disposed along the refrigerant line.

21. An air conditioning system comprising:
a compressor,
a refrigerant line disposed in communication with the compressor for carrying refrigerant; and
a first power generating unit disposed in communication with the refrigerant line for converting heat from the refrigerant line into usable energy by moving a mechanical structure,
the first power generating unit comprising a turbine and a vacuum chamber having a reservoir holding a fluid and wherein the refrigerant line is disposed in communication with the reservoir to boil a liquid contained therein, and wherein the vacuum chamber includes an expansion chamber disposed on a side of the turbine functionally opposite of the reservoir; and
a second power generating unit disposed in communication with the refrigerant line for converting heat from the refrigerant line into usable energy by moving a mechanical structure.

22. The air conditioning system of claim 21, wherein the second power generating unit comprises a piston.

23. The air conditioning system of claim 21, wherein the second power generating unit comprises a Stirling engine.

24. The air conditioning system of claim 21, further comprising a cooling chamber, the refrigerant line passing through the cooling chamber, a cooling coil; and a heat transfer line attached adjacent one end of the cooling chamber, passing through the cooling coil and returning to the cooling chamber; and a pump disposed along the heat transfer line.

* * * * *